United States Patent
Hudson et al.

(10) Patent No.: US 12,188,203 B2
(45) Date of Patent: Jan. 7, 2025

(54) AUXILIARY MOTIVATION SYSTEM FOR WORK MACHINES

(71) Applicant: Caterpillar Global Mining Equipment LLC, Denison, TX (US)

(72) Inventors: Charles Taylor Hudson, Sherman, TX (US); John Francis Halterman, Sherman, TX (US)

(73) Assignee: Caterpillar Global Mining Equipment LLC, Denison, TX (US)

(*) Notice: Subject to any disclaimer, the term of this patent is extended or adjusted under 35 U.S.C. 154(b) by 14 days.

(21) Appl. No.: 18/108,436

(22) Filed: Feb. 10, 2023

(65) Prior Publication Data

US 2024/0271391 A1   Aug. 15, 2024

(51) Int. Cl.
*E02F 9/20* (2006.01)
*B60K 25/00* (2006.01)
*E21B 7/02* (2006.01)

(52) U.S. Cl.
CPC ............ *E02F 9/2025* (2013.01); *B60K 25/00* (2013.01); *E21B 7/02* (2013.01); *E21B 7/022* (2013.01)

(58) Field of Classification Search
CPC ............ B60K 25/00; E21B 7/02; E21B 7/022
See application file for complete search history.

(56) References Cited

U.S. PATENT DOCUMENTS

| 4,218,886 | A | 8/1980 | White | |
| 5,082,068 | A * | 1/1992 | Cornell | E21B 7/02 173/39 |
| 5,678,982 | A | 10/1997 | Schwaiger | |
| 6,568,493 | B2 | 5/2003 | Parkert et al. | |
| 9,026,270 | B2 * | 5/2015 | Poettker | E21B 44/00 701/2 |
| 2007/0210236 | A1 * | 9/2007 | Yungner | B60P 3/14 248/678 |
| 2018/0282967 | A1 * | 10/2018 | Elliott | E02D 7/08 |
| 2018/0298731 | A1 * | 10/2018 | Bishop | H02J 3/381 |
| 2021/0156403 | A1 | 5/2021 | Rushton et al. | |
| 2021/0395974 | A1 * | 12/2021 | Geelhoed | E02D 17/13 |
| 2023/0064970 | A1 * | 3/2023 | Bishop | F04B 47/02 |

FOREIGN PATENT DOCUMENTS

| CN | 106761399 B | 4/2020 |
| CN | 215762579 U | 2/2022 |
| JP | 2013234549 A | 11/2013 |

* cited by examiner

*Primary Examiner* — David E Sosnowski
*Assistant Examiner* — Matthew Wiblin

(57) ABSTRACT

An auxiliary motivation system for a work machine may be provided where the work machine has a power source for powering a hydraulic system to hydraulically power a hydraulic motor of a drive system of the work machine. The auxiliary motivation system may include an auxiliary motivation device that includes an auxiliary power source and an auxiliary hydraulic system powered by the auxiliary power source. The auxiliary hydraulic system may be configured for fluid coupling to the hydraulic motor of the drive system of the work machine to drive the work machine in place of the hydraulic system on the work machine.

19 Claims, 5 Drawing Sheets

AUXILIARY MOTIVATION SYSTEM FOR WORK MACHINES

TECHNOLOGICAL FIELD

The present application relates generally to auxiliary power systems for work machines such as tracked drills, electric rope shovels, excavators, or "bull dozers." More particularly, the present application relates to auxiliary power systems for electrically powered work machines. Still more particularly, the present application relates to auxiliary power systems for electrically powered work machines that rely on a hydrostatic transmission for propulsion and steering.

BACKGROUND

Electrically powered work machines may rely on a tether system to provide high voltage power. For example, the work machines may include reels that hold and/or house electrical power cables. The electrical power cable may be relatively long and may allow the work machine to be powered by relatively nearby power stations or by a series of power stations along the route of the work machine. That is, when the work machine needs to move from one location to another, the power cable may be pulled to a power station in front of the work machine to power a traction or drive system of the work machine. As the work machine moves toward and passed the power station, the power cable may be drawn in and then paid back out to allow the work machine to move. When all of the power cable is paid out, the work machine may stop, and the power cable may be pulled to another power station in front of the work machine. This process can be cumbersome and slow, cable reels can break, or other operational problems can occur, and power stations may not be available. While the work machine may have onboard batteries, the batteries may not be sufficient to move the work machine long distances, the batteries may not have sufficient power to move the machine at all, or it may simply not be desirable to rely on the battery power for this purpose.

U.S. Pat. No. 6,568,493 relates to a skid-steer loader power source attachment and method of manufacture. A power source attachment is provided that runs only off the auxiliary hydraulics of a skid-steer, loader, or other prime mover. It can run lights and still have extra power to run one or more electrically operated tools on a construction or other jobsite, such as welders, jackhammers, air compressors, saws, drills, grinders, and the like. U.S. Pat. No. 4,218,886 relates to hydraulic power packs. A hydraulic power pack includes a prime mover driving a plurality of hydraulic pumps, a hydraulic circuit including a reservoir connected to an inlet of said pumps, an outlet circuit from said pumps, one or more pressure relief valves in the outlet circuit and a plurality of external connectors on the outlet circuit.

SUMMARY

In one or more examples an auxiliary motivation system for a work machine may be provided where the work machine includes a power source for powering a hydraulic system to hydraulically power a hydraulic motor of a drive system of the work machine. The auxiliary motivation system may include an auxiliary motivation device including an auxiliary power source and an auxiliary hydraulic system powered by the auxiliary power source. The auxiliary hydraulic system may be configured for fluid coupling to the hydraulic motor of the drive system of the work machine to drive the work machine in place of the hydraulic system on the work machine.

In another example, a work machine may include a power source, a hydraulic system powered by the power source, and a drive system comprising a hydraulic motor configured for receiving hydraulic power from the hydraulic system to drive the work machine. The work machine may also include a machine-side interface configured for coupling to an auxiliary motivation device to receive hydraulic power to drive the hydraulic motor in place of the hydraulic system.

In still another example, a method of driving a work machine may be provided. The work machine may include a power source for powering a hydraulic system to hydraulically power a hydraulic motor of a drive system of the work machine. The method may include delivering hydraulic power to the work machine from an auxiliary motivation device and controlling the delivering to drive the hydraulic motor of the drive system to drive the work machine.

DETAILED DESCRIPTION

Figure 1:
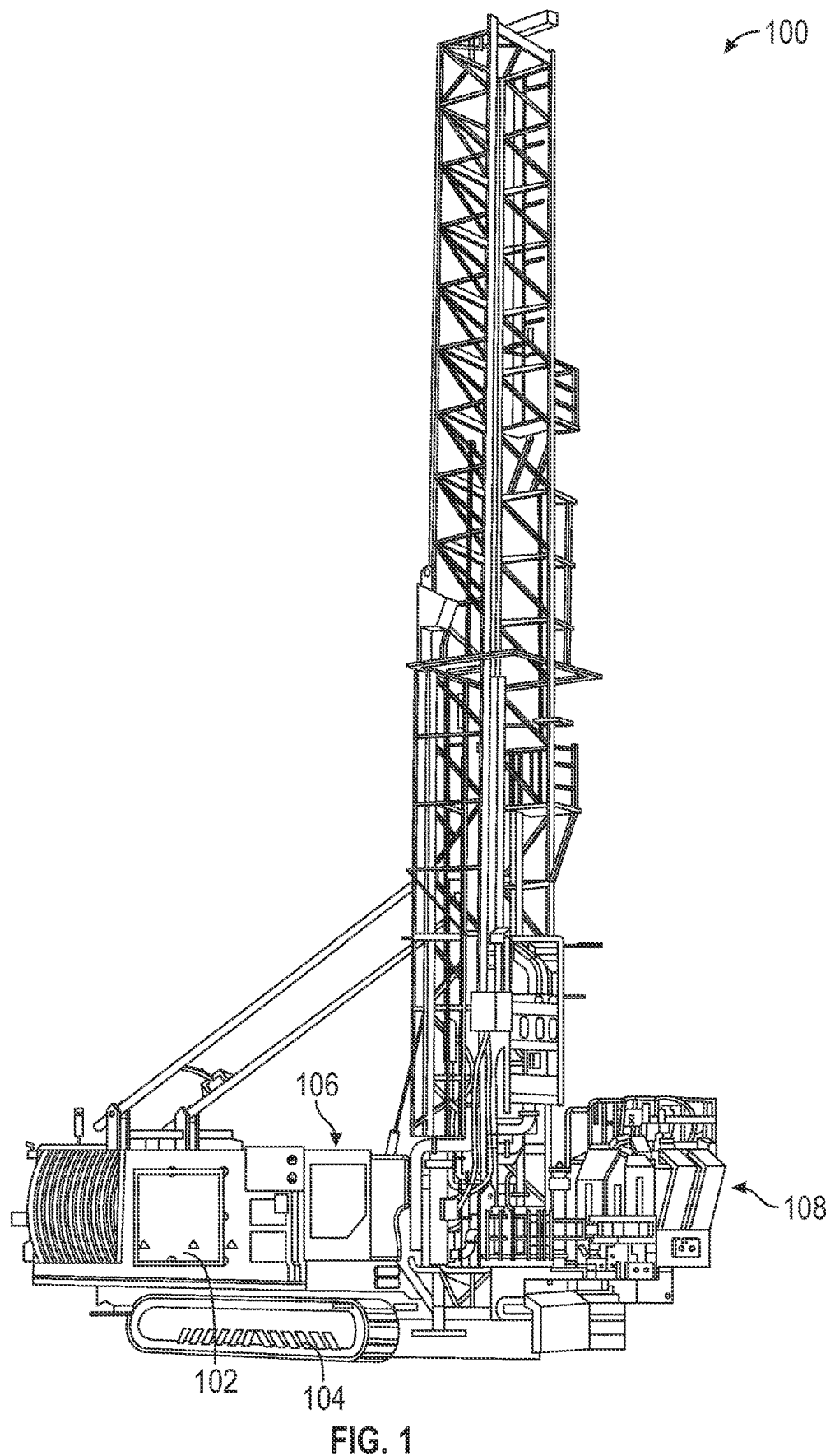
FIG. 1 is a front and right-side perspective view of a work machine adapted for use with an auxiliary motivation device, according to one or more examples.

FIG. 1 is a front and right-side perspective view of a work machine 100 in the form of an electrically powered blast hole drilling machine. As shown, the work machine 100 may include an onboard electrical power supply 102 such as battery or battery bank, cable reel for corded power, or other power supply 102. The work machine 100 may include a ground-engaging and motion imparting drive system such as a track system, wheel system, skid feet, or other drive system 104. In one or more examples, the work machine may include a hydraulic system 106 for operating one or more aspects of the work machine 100 including, for example, the drive system 104. The hydraulic system 106 may include a pump driven by the power supply 102. The pump may be in fluid communication with a hydraulic circuit for driving the drive system 104. In one or more examples, a hydrostatic transmission may be provided for delivering power from the pump or other aspect of the hydraulic system 106 to the drive system 104. In the case of a blast hole drilling machine, the hydraulic power may be leveraged for erecting the mast, drilling, and other functions of the work machine.

The work machine 100 may also include an operator station 108. The operator station 108 may include a cab or enclosure including a seat or chair for the operator. The station 108 may also include one or a series of input mechanisms such as a joystick, steering wheel, foot pedals, or other operational levers, switches, buttons, or other input devices. An output screen and/or dash and/or panel allowing for machine signals, messages, imagery, or other output to be presented to the operator may also be provided. While a drilling machine 100 has been highlighted here, still other work machines 100 may be provided including most any work machine 100 having a hydrostatic transmission for driving a drive system 104 for moving the work machine 100.

Figure 2:
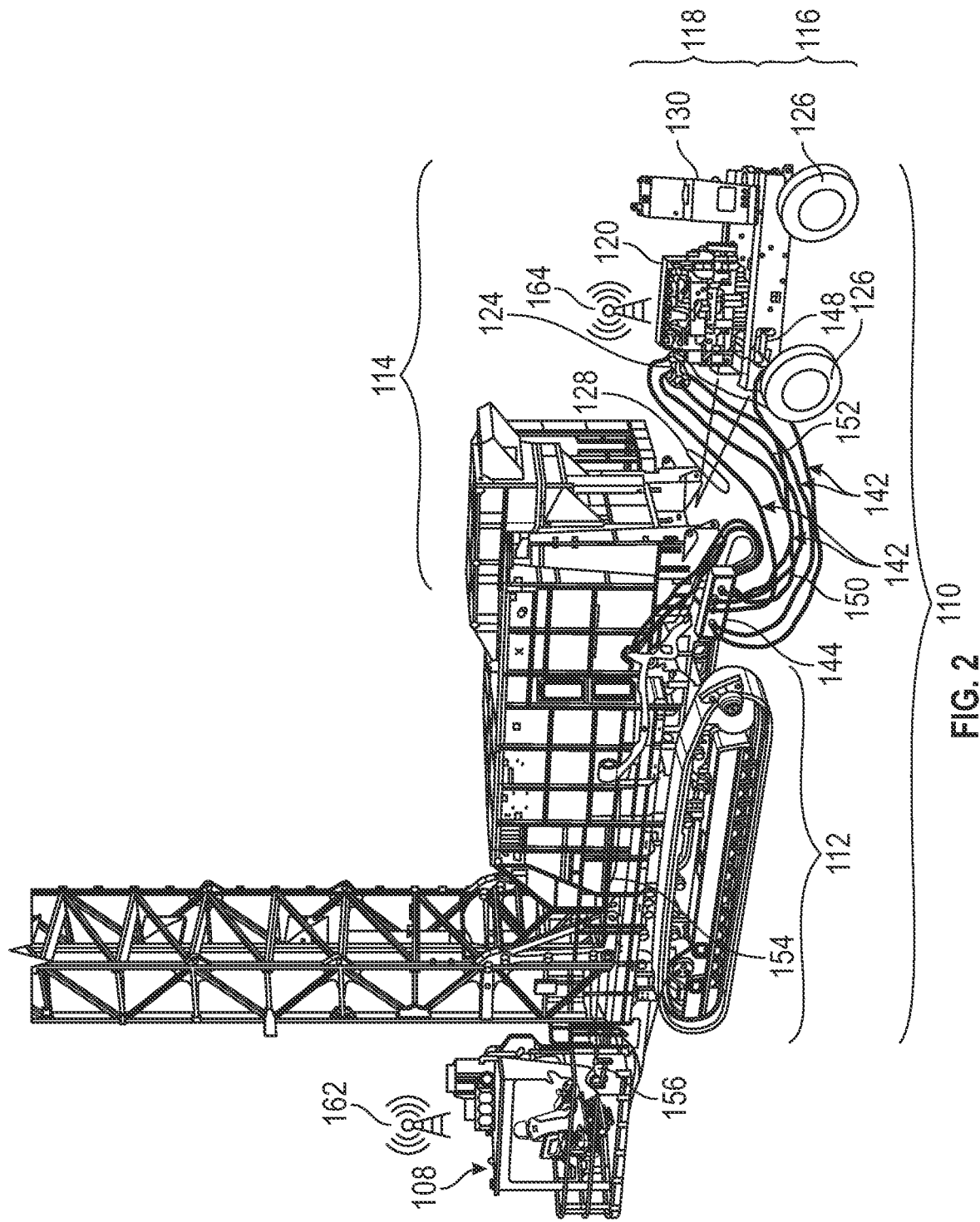
FIG. 2 is a rear and left-side perspective view of the work machine of FIG. 1 and including the auxiliary motivation device, according to one or more examples.

Turning now to FIG. 2, an auxiliary motivation system 110 for the work machine 100 may be provided. In particular, the auxiliary motivation system 110 may include an auxiliary source of hydraulic power particularly adapted for fluid coupling to the work machine 100 to hydraulically power the drive system 104 of the work machine 100. The auxiliary motivation system 110 may be well suited for assisting the work machine in moving from one location to another where power stations might not be present at or between locations, where a cable reel is not available or not functioning, where power stations are without power, or other circumstances where auxiliary power is desired for moving the work machine. The auxiliary motivation system 110 may include both onboard and offboard components 112/114, where the onboard components 112 function to allow interaction of the offboard components 114 with the work machine 100 and the offboard components 114 provide hydraulic power, control, electrical power, and/or other functionality. In some cases, the one or more of the offboard components 114 may be somewhat redundant to components on the work machine 100 and may be deemed auxiliary components.

With continued reference to FIG. 2, the offboard components 114 may be configured to provide hydraulic power and may also be configured to provide control signals and/or electrical power to the work machine. As shown, the offboard components 114 may include an auxiliary motivation device, which may include a transport system 116 and equipment 118 being transported.

The transport system 116 may include a dolly such as a cart, a skid, a mule, a wagon, or a barrow, for example. The equipment 118 being transported may be arranged on the dolly and may include a power source 120 such as an engine, a battery, or a fuel cell, for example. In one or more examples, the power source 120 may include a diesel engine. In the case of an engine, the power source 120 may include a power takeoff for coupling to and driving the pump 124. In the case a battery power source, the battery may run a motor that drives the pump.

The dolly may include a frame for supporting the power source 120 and/or the pump 124, as the case may be. The frame may be supported above or at or near the ground by a ground engaging system 126 such as a wheel system, track system, ski or skid system, or other ground engaging feature. The ground engaging system 126 may be a powered system or a passive system.

In the case of a powered ground engaging system, this may include one or more powered wheels or tracks for moving and/or steering the dolly. For example, a hydraulic system may be provided where the pump provides hydraulic power and the ground engaging system may be powered and steered by the hydraulic system.

In the case of a passive ground engaging system, this may include non-powered wheels, tracks, or skids, for example. For the passive system, or even one of the powered ground engaging systems, the dolly may include a hitch system 128 for hitching to the work machine 100 to be pulled by the work machine 100. The hitch system 128 of the dolly may be coupled to a pivoting front axle on the dolly, for example, to facilitate following of the work machine 100 by the dolly. The hitch may be similar to a wagon where a relatively rigid post or frame is removably connectable to a hitch on the work machine 100 and lateral motion of a front end of the post or frame causes pivoting of the front axle about a vertical axis to steer the wagon. In one or more examples, a passive ground engaging system may include a dolly that is permanently or temporarily mounted to the work machine 100. Here, the dolly may take the form of a platform that is removably attachable to the work machine 100 or more permanently attached.

In one or more examples, the dolly may be omitted and the equipment 118 may, instead, be arranged on a surface on the work machine 100 adapted to physically support the otherwise offboard equipment 118. That is, while referred to as an offboard components 114, the work machine may, in some circumstances, carry the offboard components 114.

As mentioned, the equipment 118 may include a pump 124. The pump 124 may be an auxiliary pump as part of an auxiliary hydraulic system 132 of the offboard equipment 118 and may be configured to deliver hydraulic fluid flow suitable for use by the work machine 100 to move the work machine 100. That is, the auxiliary hydraulic system 132 may include a system where fluid is supplied from a tank 130 to the auxiliary pump 124 and driven by the auxiliary pump 124 to connecting lines for connecting to the work machine 100.

Figure 5:
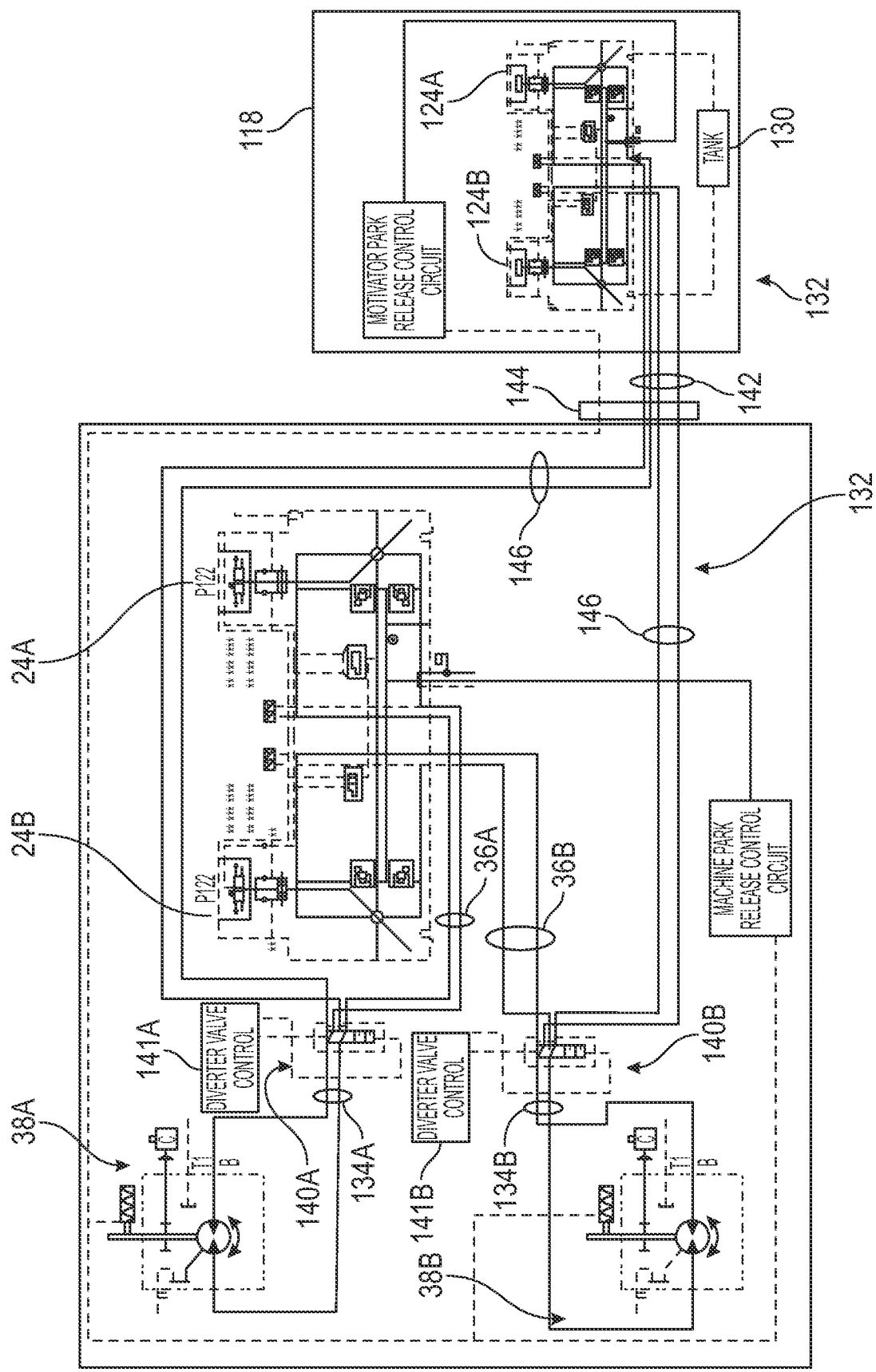
FIG. 5 is a schematic hydraulic diagram of an auxiliary motivation system for a work machine, according to one or more examples.

With respect to the auxiliary hydraulic system 132, a particular example is shown in FIG. 5 where multiple auxiliary pumps 124A/B may be provided as part of the offboard equipment. For example, the auxiliary hydraulic system 132 of the offboard equipment 118 may mirror that of the work machine 100. That is, where two hydraulic pumps 24A/B are provided on the work machine 100, two auxiliary hydraulic pumps 124A/B may be provided as part of the offboard equipment 118. The auxiliary pumps 124A/B may be smaller than the pumps on the work machine since the auxiliary pumps may be used for moving the work machine and might not be sized to support the other hydraulic operations of the work machine. Nonetheless, each of the auxiliary pumps 124A/B may be configured to be placed in fluid communication with the fluid supply/return lines 134A/B that are normally supplied with hydraulic fluid by the pumps on the work machine. For example, a first pump 24A on the work machine 100 may include a supply and return line 36A leading to right-side drive track 38A and a second pump 24B on the work machine 100 may include a supply and return line 36B leading to the left-side drive track 38B. The offboard equipment 118 may, likewise, include a first auxiliary pump 124A and, when fluidly coupled to the work machine 100, may supply fluid to the right-side drive track 38A and provide a return. The offboard equipment may also include a second auxiliary pump 124B and, likewise, when fluidly coupled to the work machine 100, may supply fluid to the left-side drive track 38B and provide a return. While discussed in more detail below, suffice to say for now that diverter valves 140A/B may be provided on the work machine 100 that allow for selecting between the fluid supply/return to be provided by the pump(s) 24A/B on the work machine 100 or the auxiliary pump(s) 124A/B of the offboard equipment 118.

The auxiliary hydraulic system 132 may be coupled to the work machine 100 with hydraulic hoses 142 extending from outlet ports on the one or more auxiliary pumps or from other aspects of the auxiliary hydraulic system 132. Hydraulic hoses 142 may also extend from the one or more inlet ports on the tank or other aspects of the auxiliary hydraulic system 132. The hoses 142 may be adapted for coupling to the work machine 100 to provide supply and return lines to and from the work machine 100 for providing hydraulic power to the work machine 100. In one or more examples, the hoses 142 may include couplings at the free ends thereof for coupling to a machine-side interface 144 described in more detail below.

It is to be appreciated that while multiple auxiliary pumps 124A/B are shown as part of the offboard equipment 118, more or fewer auxiliary pumps may be provided. For example, where a single auxiliary pump is provided, a control valve may be provided with the offboard equipment 118 that allows for directing fluid to each of the right-side drive track, the left-side drive track, or both. Still other numbers of auxiliary pumps and valve arrangements may be provided.

As shown in FIG. 5, an auxiliary hydraulic fluid tank 130 may be provided as part of the offboard equipment 118 and may be used by the auxiliary hydraulic system 110 to deliver hydraulic power to the work machine 100. As shown, the one or more auxiliary pumps 124A/B may draw fluid from the auxiliary tank 130 and deliver the fluid to work machine supply lines 146. In one or more examples, rather than providing an auxiliary tank 130, the offboard equipment 118 may leverage the hydraulic fluid tank on the work machine 100. That is, for example, return lines from the drive tracks on the work machine 100 may lead to the tank on the work machine and additional return lines may extend from the tank on the work machine to the machine-side interface 144 allowing the auxiliary pump or pumps 124A/B of the offboard equipment 118 to draw hydraulic fluid from the work machine 100 to, in turn, supply fluid to the drive tracks 38A/B of the work machine 100. Still other tank arrangements may be provided.

An electronic control module 148 (see FIG. 2) may be provided as part of the offboard equipment 118 for controlling operation of the offboard equipment 118 and/or operation of the work machine 100. The electronic control module 148 may include a computer readable storage medium with computer-implemented instructions stored thereon for operating the offboard equipment 118, the dolly, and/or the work machine 100. The computer-implemented instructions may include hardware, software, or a combination thereof. The computer-implemented instructions may include operational instructions and/or signals that allow for operation of the associated equipment. The details of the operation are discussed in more detail below regarding operation and use. The electronic machine control (ECM) may be in signal and/or electrical communication with the power source 120 and power-driven drive portions of the dolly and/or other operable components of the dolly or the offboard equipment 118. In addition, the ECM may be configured to be placed in signal and/or electrical communication with work machine 100. That is, the ECM may be connectable to the work machine 100, for example, with a control cord 150 for providing control signals to the work machine 100. The control cord 150 may have a plug/outlet end for coupling to a work-machine interface 144 or other feature on the work machine 100. In addition, electrical power cords may also be provided, which may extend, for example, from the battery and may include a plug/outlet end for coupling to a machine-side interface 144 or other feature on the work machine 100.

It is to be appreciated that the hydraulic lines/hoses 142, control cords or lines 150, and/or electrical power cords or lines 152 extending between the offboard equipment 118 and the work machine 100 may be generally permanently associated with and/or attached to the offboard equipment 118 as described above, since their use may be relatively dependent on the presence of the offboard equipment 118. As such, a dedicated dolly-side interface has not been described. However, a dolly-side interface may be provided similar to the machine-side interface 144 described below. In this situation, the hydraulic lines/hoses, control lines/cords, and electrical lines/cords on the offboard equipment 118 may extend to the dolly-side interface. During use, a user may couple hydraulic hoses, control cords, and electrical cords between the respective ports on the dolly-side interface and the machine-side interface 144. Still other approaches to coupling the offboard equipment 118 to the work machine 100 may be provided.

With continued reference to FIGS. 2 and 5, several onboard components 112 of the auxiliary motivation system 110 may be provided to accommodate operation of the work machine 100 by, or in conjunction with, the offboard components 114. That is, the onboard components 112 may be configured to receive hydraulic fluid from the offboard components 114, return the hydraulic fluid to the offboard components 114 and also to receive control signals and/or electrical power from the offboard components 114. The onboard components 112 may also be configured to, for example, adjust the hydraulic system of the work machine 100 so that it may function with the offboard components 114. As shown, the work machine 100 may include a machine-side interface 144, offboard-fluid supply and return lines 146, one or more diverter valves 140A/B and associated controls 141A/B, and a control line 154 (see FIG. 2).

The machine-side interface 144 may be configured to allow fluid coupling of the auxiliary hydraulic system 110 to the hydraulic system on the work machine 100. The machine-side interface 144 may also allow for coupling of the offboard control and/or electrical systems to control and/or electrical systems on the work machine 100. For example, the machine-side interface 144 may allow for electrical and/or data communication between the ECM 148 of the offboard equipment 118 and an ECM 156 of the work machine 100. The machine-side interface 144 may include a plurality of hydraulic ports for connection of hydraulic hoses where the fluid flow from the auxiliary motivation device may be delivered and transferred to the work machine 100 and, in turn, used to drive one or more portions of the work machine 100 such as the drive system 106 or a part thereof. In one or more examples, the machine-side interface 144 may include a supply port and a return port for placement in fluid communication with the first auxiliary pump 124A of the offboard equipment 118 and a supply port and a return port for placement in fluid communication with the second auxiliary pump 124B of the offboard equipment 118. The ports may include quick connect hose fittings that provide for connection of hoses that may have their other end connected to the offboard equipment. In one or more examples, the fittings may include check valves for closing the ports when a hose is not connected to prevent entry of foreign matter. Fitting covers or other protective devices may also be provided.

Supply and return lines 146 may extend from the machine-side interface 144 to a diverter valve 140A/B for each of the right-side drive track 38A and the left-side drive track 38B or other hydraulically operated drive system 106. The diverter valve 140A/B may include two positions including a machine power position and an auxiliary power position. For example, the diverter valve 140A/B may be biased in the machine power position that places the supply and return lines 36A/B from the machine in fluid communication with supply and return lines 134A/B of the respective drive track 38A/38B. However, the diverter valve 140A/B may be operable by a solenoid that may shift the valve to an auxiliary power position that places the supply and return lines 146 from the auxiliary hydraulic system 132 in fluid communication with the supply and return lines 134A/B of the respective drive track 38A/B. Each or both of the diverter valves 140A/B may be in signal communication with a diverter valve control 141A/B which may be operable based on a hydraulic signal or pilot line configured to sense when pressure is present in the supply and return lines 146 extending from the machine-side interface 144. That is, when pressure is present in the supply/return lines 146 coming from the offboard equipment 118, the control 141A/B may trigger the solenoid to shift the diverter valve 140A/B to the auxiliary power position. In one or more other examples, the diverter valves 140A/B could be controlled by pilot pressures or they could be electronically controlled.

As shown in FIG. 2, a control cord or line 154 may be provided extending from the electronic machine control (ECM) 156 on the work machine 100 to the machine-side interface 144. As mentioned, a control cord or line 150 may be provided extending from the ECM 148 of the offboard equipment 118 to a free end adapted for connecting to the machine-side interface 144. As such, the ECM 156 on the work machine 100 may be placed in communication with the ECM 148 of the offboard equipment 118.

With continued reference to FIG. 5, a machine park release control circuit is shown. In one or more examples, the brakes on the work machine and/or the transport system may be spring-applied brakes that default to a braking condition. The brake system may be similar to air brake systems, but the brakes may be releasable with hydraulic pressure rather than air pressure. The ECM 148 may be in control communication with the park release control circuit of the work machine and/or the transport system to allow for the release of the brakes when movement of one or the other is desired.

Figure 3:
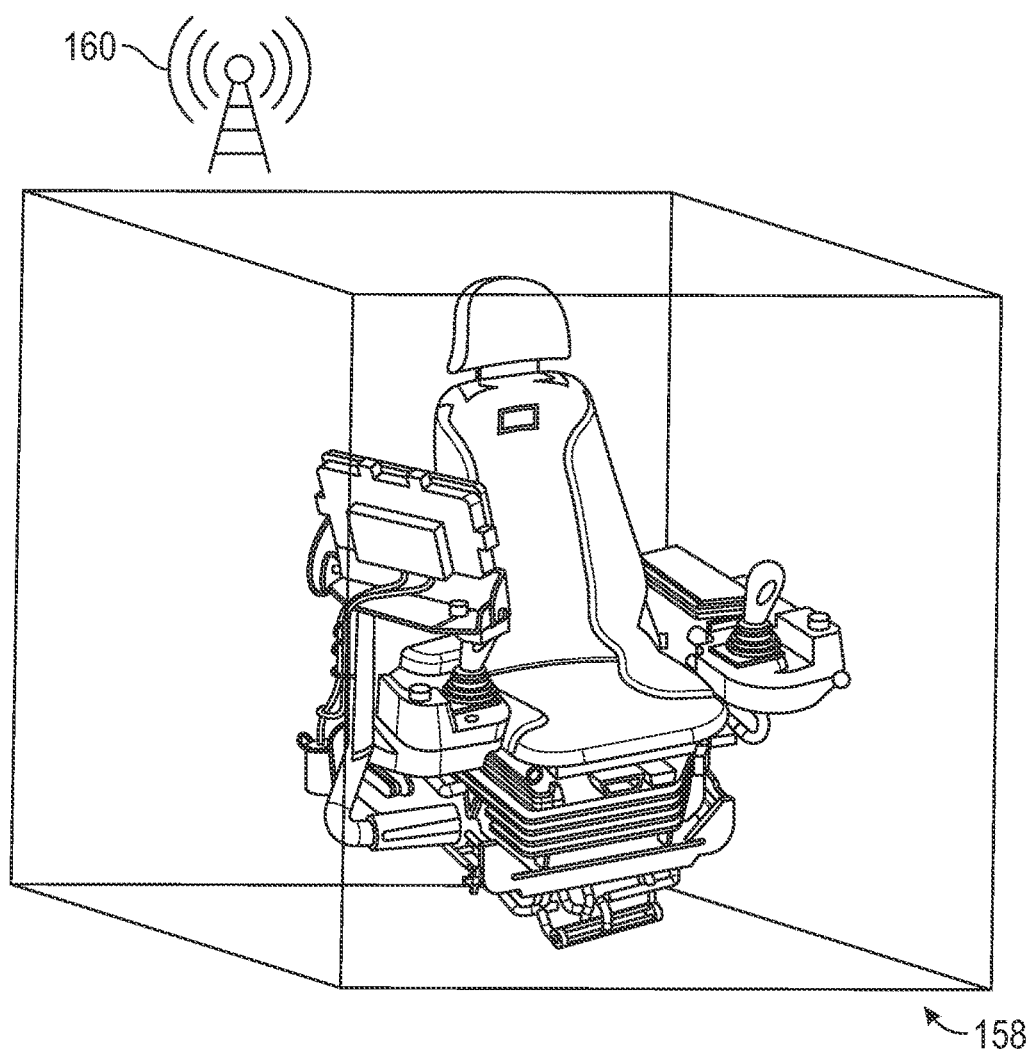
FIG. 3 is a close-up view of an operator station of the work machine of FIG. 1.

With reference to FIG. 3, a remote operator station 158 may be provided for operating the work machine 100 and/or the auxiliary motivation device. The remote operator station 100 may mimic the operator station 108 described with respect to the work machine 100 and may include many or all of the same features described with respect to the operator station 108 on the work machine 100. In some examples, the remote operator station 158 may include additional screens to provide the remote operator with visual information about the surroundings of the work machine. In some cases, the remote operator station may include virtual reality systems such as head ware or other features to assist with the awareness of the operator. The remote operator station 158 may include a transceiver 160 for communication with a network in wired or wireless fashion and the work machine 100 and/or the auxiliary motivation device may also include transceivers 162/164 for wireless connection to a network providing for communication of controls and output between the remote operator station 158 and the work machine 100 and/or the auxiliary motivation device.

Figure 4:
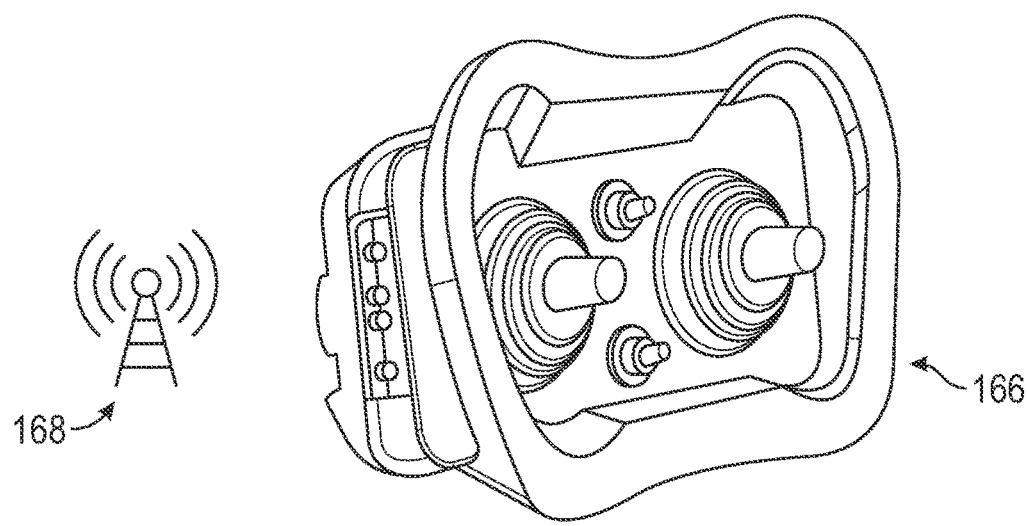
FIG. 4 is a perspective view of a hand-held wireless controller, according to one or more examples.

With reference to FIG. 4, a handheld device 166 may also be provided that may provide for operating the work machine 100 and/or the auxiliary motivation device. The handheld device 166 may include many of the same input features of the operator station 108 on the work machine and/or the remote operator station 158. Fewer of the output features may be provided and may be more limited to, for example, power lights, warning lights, sound alerts and the like. In other examples, the handheld device 166 may include many or all of the same features as the operator station 108 on the work machine or the remote operator station 158. The handheld device 166 may include a transceiver 168 that may be in direct (e.g., short-range wireless) or indirect (e.g., via cellular or other network) wireless or wired/tethered communication with the work machine 100 and/or the auxiliary motivation device. As mentioned, the work machine 100 and/or the auxiliary motivation device may also each include a transceiver 162/164 for wireless communications. Where the handheld device 166 is wired to the auxiliary motivation device, the transceiver 168 may include a wired transceiver. Still other configurations of wired and/or wireless communications may be provided.

INDUSTRIAL APPLICABILITY

Figure 6:
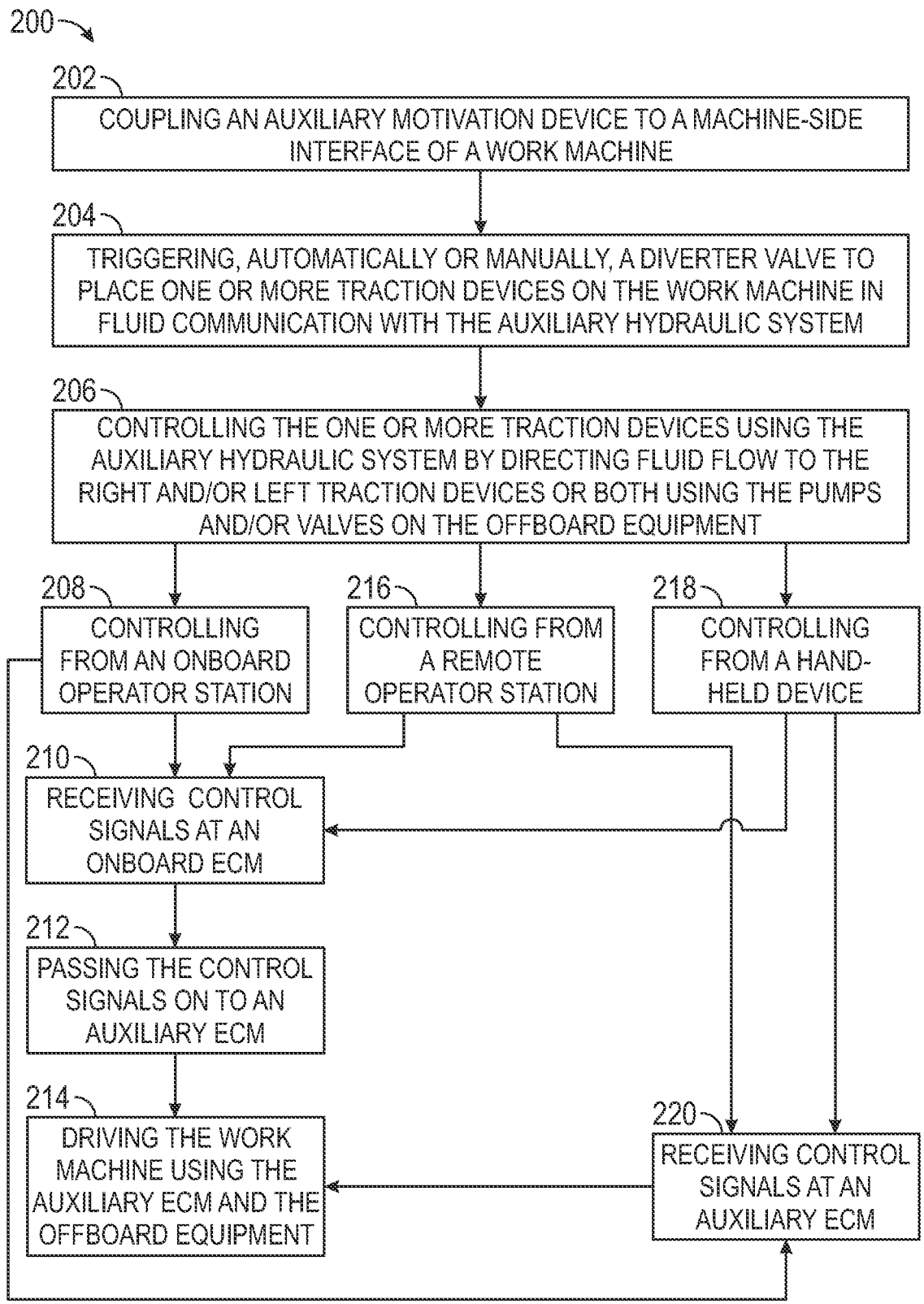
FIG. 6 is a diagram depicting a method of driving a work machine using an auxiliary motivation system, according to one or more examples.

In operation and use, and as shown in FIG. 6, a method 200 of driving a work machine using an auxiliary motivation system may include coupling 202 an auxiliary motivation device to a machine-side interface of a work machine. In particular, this may include fluidly coupling the auxiliary hydraulic system of the offboard equipment to the machine-side interface. The method may also include triggering 204, automatically or manually, a diverter valve to place one or more traction devices on the work machine in fluid communication with the auxiliary hydraulic system. The method may also include controlling 206 the one or more traction devices using the auxiliary hydraulic system. That is, controlling the one or more traction devices may include directing fluid flow to the right and/or left traction devices or both using the pumps and/or valves on the offboard equipment, which may also include controlling the direction of the flow to allow for forward or reverse operation of each track.

It is to be appreciated that there may be several ways to implement the above method based on the various control systems that have been described above. For example, the operator of the work machine may operate or control 208 the work machine in conjunction with the auxiliary motivation system from the operator station on the work machine. Here, the operator may operate the drive system of the work machine in a same or similar manner to the way the operator would operate the drive system were the auxiliary motivation device not connected. For this example, coupling the auxiliary motivation device to the machine-side interface may include connecting a control cord of the offboard equipment to the machine-side interface, which may trigger the ECM on the work machine to recognize that control of the drive system may be handled by the ECM of the offboard equipment. Accordingly, as the operator provides control signals from the operator station, the control signals received 210 by the ECM on the work machine may be transmitted or passed along 212 to the ECM of the offboard equipment to allow the offboard equipment to control the drive system of the work machine. The ECM of the offboard equipment may receive the control signals and drive 214 the traction or drive system of the work machine by providing fluid flow to the respective left, right, or both traction systems based on the signals.

In another example, an operator may be operating or controlling 216 the work machine from a remote operator station. That is, the operator may be drilling blast holes or operating the respective work machine in a manner consistent with what it was designed for. These activities may be conducted wirelessly due to the wireless communication between the remote operator station and the work machine. When it comes time to move to a new location, onsite personnel may connect the auxiliary motivation device to the machine-side interface. In other examples (e.g., when the offboard equipment is arranged on the work machine), the auxiliary motivation device may already be connected to the machine-side interface and the remote operator may provide an input (e.g., flip a switch, change a setting, etc.) that activates the offboard equipment. As with the example where the operation is from the operation station on the work machine, the activation of the offboard equipment may cause the ECM on the work machine to recognize that drive operations are going to be controlled by the ECM of the offboard equipment. As such, when the operator provides drive instructions, such signals may be received 210 by the ECM on the work machine and passed along 212 to the ECM of the offboard equipment allowing the offboard equipment to drive 214 the drive system of the work machine.

In still another example, an operator may be onsite, but using a handheld device to operate the auxiliary motivation device. For example, onsite personnel may use a handheld device to operate or control 218 the work machine in its normal manner or the handheld device may be dedicated to operating the auxiliary motivation device. In the case of a handheld device configured for operating the work machine, the handheld device may be used in a manner similar to that of a remote operator station where, once triggered, drive instructions received by the work machine ECM may be passed along to the ECM of the offboard equipment to provide fluid to the drive system of the work machine and, thus, drive the work machine. Where the handheld device, instead, is in communication with the auxiliary motivation device, signals from the handheld device may be received 220 more directly by the ECM of the offboard equipment allowing the offboard equipment to provide fluid to the drive system of the work machine and drive 214 the work machine. It is to be appreciated that the onboard operator station and the remote operator station may also be configured to communicate directly with the auxiliary ECM to drive the work machine using the auxiliary ECM and offboard equipment. That is, the onboard operator station and the remote operator station may not communicate with the auxiliary ECM via the onboard ECM.

In still further examples, an operator station such as a sitting station or stand on station may be provided on the auxiliary motivation device where the inputs/outputs described with respect to the handheld or other operator stations are provided directly on the auxiliary motivation device. This system may be operated in a manner similar to a handheld device in communication with the auxiliary motivation device. Still other operational approaches may also be used.

The above detailed description is intended to be illustrative, and not restrictive. The scope of the disclosure should, therefore, be determined with references to the appended claims, along with the full scope of equivalents to which such claims are entitled.

What is claimed is:

1. An auxiliary motivation system for a work machine, the work machine having a power source for powering a hydraulic system to hydraulically power a hydraulic motor of a drive system of the work machine, wherein the hydraulic motor comprises a left-side traction device and a right-side traction device, the auxiliary motivation system comprising:
    an auxiliary motivation device, comprising:
        an auxiliary power source;
        an auxiliary hydraulic system powered by the auxiliary power source and configured for fluid coupling to the hydraulic motor of the drive system of the work machine to drive the work machine in place of the hydraulic system; and
        an electronic control module (ECM) configured to selectively control a delivery of hydraulic fluid from the auxiliary hydraulic system to the left-side traction device and the right-side traction device to move and steer the work machine across a supporting surface.

2. The auxiliary motivation system of claim 1, wherein the auxiliary motivation device comprises a dolly configured as a trailer for trailing behind the work machine.

3. The auxiliary motivation system of claim 1, wherein the ECM is configured for controlling the auxiliary motivation device.

4. The auxiliary motivation system of claim 3, wherein the ECM is configured for controlling the auxiliary hydraulic system for the delivery of the hydraulic fluid to the hydraulic motor of the drive system of the work machine.

5. The auxiliary motivation system of claim 4, wherein a diverter valve is arranged on the work machine and controls whether hydraulic power is provided by the hydraulic system or the auxiliary hydraulic system.

6. The auxiliary motivation system of claim 3, wherein the ECM is an auxiliary ECM and is configured for placement in communication with an ECM on the work machine.

7. The auxiliary motivation system of claim 6, wherein control signals from an operator that are received by the ECM on the work machine are passed along to the auxiliary ECM to control the auxiliary hydraulic system for the delivery of the hydraulic fluid to the drive system of the work machine.

8. The auxiliary motivation system of claim 7, wherein the ECM on the work machine is in communication with an operator station on the work machine configured to deliver the control signals to the ECM on the work machine.

9. The auxiliary motivation system of claim 7, wherein the ECM on the work machine is in communication with a remote operator station configured to deliver the control signals to the ECM on the work machine.

10. The auxiliary motivation system of claim 3, further comprising a handheld operator station configured to deliver control signals to the ECM.

11. A work machine, comprising:
    a power source;
    a hydraulic system powered by the power source;
    a drive system comprising a hydraulic motor configured for receiving hydraulic power from the hydraulic system to drive the work machine, wherein the hydraulic motor comprises a left-side traction device and a right-side traction device;
    a machine-side interface configured for coupling to an auxiliary motivation device to receive auxiliary hydraulic power to drive the hydraulic motor in place of the hydraulic system;
    an electronic control module on the auxiliary motivation device; and
    wherein the electronic control module is configured to selectively control a delivery of the auxiliary hydraulic power from the auxiliary hydraulic system to the left-side traction device and the right-side traction device to move and steer the work machine across a supporting surface.

12. The work machine of claim 11, wherein a diverter valve is configured to control the delivery of the auxiliary hydraulic power to the hydraulic motor by selecting between the hydraulic system and an auxiliary hydraulic system of the auxiliary motivation device.

13. The work machine of claim 12, wherein the electronic control module is configured to control the hydraulic system under normal operation and to pass control signals on to an electronic control module of the auxiliary motivation device under auxiliary operation.

14. A method of driving a work machine, the work machine having a power source for powering a hydraulic system to hydraulically power a hydraulic motor of a drive system of the work machine, wherein the hydraulic motor comprises a left-side traction device and a right-side traction device, the method comprising:

delivering auxiliary hydraulic power to the work machine from an auxiliary motivation device; and using an electronic control module, controlling a diverter valve to selectively control the delivering of the auxiliary hydraulic power to drive the left-side traction device and the right-side traction device to move the work machine across a supporting surface.

15. The method of driving of claim 14, further comprising fluidly coupling the auxiliary motivation device to the work machine at a machine-side interface.

16. The method of driving of claim 14, wherein the electronic control module comprises an electronic control module on the work machine or an electronic control module associated with the auxiliary motivation device and wherein the controlling comprises receiving control signals at the electronic control module.

17. The method of driving of claim 16, wherein the controlling comprises receiving the control signals at the electronic control module on the work machine, the method further comprising passing the control signals on to the electronic control module associated with the auxiliary motivation device.

18. The method of driving of claim 17, wherein the receiving the control signals comprises receiving the control signals from an operator station on the work machine.

19. The method of driving of claim 17, wherein the receiving the control signals comprises receiving the control signals form a remote operator station.

* * * * *